United States Patent
Richards et al.

(10) Patent No.: US 8,268,925 B2
(45) Date of Patent: Sep. 18, 2012

(54) GRAFT COPOLYMER AND COMPOSITIONS THEREOF

(75) Inventors: Stuart N. Richards, Frodsham (GB); Andrew J. Shooter, Altrincham (GB)

(73) Assignee: Lubrizol Limited, Hazelwood, Derby (GB)

( * ) Notice: Subject to any disclaimer, the term of this patent is extended or adjusted under 35 U.S.C. 154(b) by 383 days.

(21) Appl. No.: 12/601,032

(22) PCT Filed: May 23, 2008

(86) PCT No.: PCT/EP2008/056372
§ 371 (c)(1),
(2), (4) Date: Nov. 20, 2009

(87) PCT Pub. No.: WO2008/145613
PCT Pub. Date: Dec. 4, 2008

(65) Prior Publication Data
US 2010/0152339 A1    Jun. 17, 2010

Related U.S. Application Data

(60) Provisional application No. 60/940,138, filed on May 25, 2007.

(51) Int. Cl.
*C08F 220/34* (2006.01)
*C08F 220/10* (2006.01)
*C08F 220/26* (2006.01)

(52) U.S. Cl. ........ 524/556; 524/543; 524/597; 524/602; 524/606; 526/312; 526/310; 526/319

(58) Field of Classification Search ............... 526/312, 526/310, 319, 560, 543, 597, 602, 606
See application file for complete search history.

(56) References Cited

U.S. PATENT DOCUMENTS

| | | | | |
|---|---|---|---|---|
| 3,760,034 A | * | 9/1973 | Critchfield et al. | 525/412 |
| 3,816,566 A | * | 6/1974 | Critchfield | 525/63 |
| 6,037,414 A | * | 3/2000 | Simms et al. | 525/176 |

FOREIGN PATENT DOCUMENTS

| WO | 00/12582 A1 | 3/2000 |
|---|---|---|
| WO | 01/44330 A1 | 6/2001 |
| WO | 01/44332 A1 | 6/2001 |
| WO | 2004/058908 A1 | 7/2004 |

* cited by examiner

*Primary Examiner* — Satya Sastri
(74) *Attorney, Agent, or Firm* — Samuel B. Laferty

(57) ABSTRACT

The invention relates to a graft copolymer with a polyester side chain and at least one quaternised tertiary amine group. The tertiary amine may be aliphatic, aromatic or heterocyclic. The invention further relates to the use of the compound as a dispersant, particularly for pigments.

16 Claims, No Drawings

GRAFT COPOLYMER AND COMPOSITIONS THEREOF

CROSS REFERENCE TO RELATED APPLICATION

This application claims priority from PCT Application Serial No. PCT/EP2008/056372 filed on May 23, 2008, which claims the benefit of U.S. Provisional Application No. 60/940,138 filed on May 25, 2007.

FIELD OF INVENTION

The invention relates to a graft copolymer with a polyester side chain and at least one quaternised tertiary amine group. The tertiary amine may be aliphatic, aromatic or heterocyclic. The invention further relates to the use of the compound as a dispersant, particularly for pigments.

BACKGROUND OF THE INVENTION

Many coating properties often generically referred to as tinctorial properties (including, for example, colour intensity, opacity and gloss) depend upon the extent of aggregation or flocculation of pigment particles (or other particulate materials) within the coating. Colour is normally introduced into a coating formulation by addition of a pigment dispersion in solvent containing a high concentration of pigment.

The pigment dispersion is generally produced by one of a variety of milling techniques to break up the aggregates of pigment particles and reduce the average particle size. Milling is often carried out in the presence of some polymeric material which is present to stabilise the dispersion and minimize flocculation of the dispersed particles. However, some pigment dispersions disperse poorly in solvent based systems.

European Patent 0 458 479 discloses a coating composition containing a dispersant and a graft copolymer of an acrylic polymer component having a tertiary amino group and/or a nitrogen-containing heterocyclic ring and a particular polyester component.

U.S. Pat. No. 5,319,045 (and JP 4-161415 A) discloses ester-type copolymers useful for resin modifiers.

U.S. Pat. No. 6,362,274 discloses graft copolymers containing at least three sequences of distinct chemical nature. The three sequences include an anchoring group, a hydrophilic group, and a hydrophobic group. The graft copolymers are useful for preparing pigment dispersions in aqueous and/or organic media.

International Patent Application WO 01/44330 discloses a composition suitable for a pigment dispersant, which contains a graft copolymer having a macromonomer grafted onto the polymeric backbone. The graft copolymer contains an amide functional group as a pigment anchoring group. The backbone may also have attached to the backbone an additional pigment anchoring group selected from an aromatic ester, an aromatic amine, an aliphatic amine, a quaternary ammonium group, or mixtures thereof.

European Patent application EP 1 182 218 A1 and U.S. Patent Application 2003/00225207, both disclose graft copolymers for pigment dispersants.

Examples of pigment types that are known to disperse poorly in solvent based systems include perylene-based pigments, anthraquinone-based pigments or quinacridone-based pigments. Attempts to disperse these pigments in solvent based systems include utilising caprolactone:polyethylene imine copolymer dispersants (EP 632 108 A), Novolak resin dispersants (JP 09291249 A), alkylene oxide based graft copolymer dispersants (disclosed in both JP 10046050 A and JP 10060360 A), and specific acrylic graft copolymers that interact with carbon black (JP 2004091610 A).

However, it is believed that none of the dispersants provide good tinctorial properties (including at least one of acceptable dispersancy, acceptable transparency, acceptable viscosity, and acceptable shock seeding) in a final coating. Thus, there is a need to disperse a pigment in solvent based systems that is capable of providing acceptable properties to a coating. The present invention provides a composition capable of dispersing a pigment in a solvent based system.

SUMMARY OF THE INVENTION

In one embodiment, the invention provides a composition comprising a particulate solid, a carrier liquid and a graft copolymer of Formula (1):

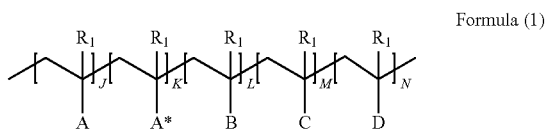

Formula (1)

wherein $R_1$ is independently a $CH_3$ or H group;

A is a moiety which contains at least one tertiary amine group (such as an aliphatic, aromatic or heterocyclic amine moiety);

A* is a quaternised amine-containing moiety;

B is a moiety that contains at least one polyester chain with a number average molecular weight of at least 200;

C is a moiety that does not contain a reactive functional group;

D is a moiety which contains at least one reactive functional group or polar group;

J, K, L, M and N are the average (non-negative) number of repeating units of each type within the graft copolymer;

J is optionally equal to 0;

K is not equal to 0;

L is not equal to 0;

M is optionally equal to 0 (typically M is equal to 0); and

N is optionally equal to 0 (typically N is equal to 0).

The units of the graft copolymer may have polymer architecture such that the distribution of moieties A, A*, B, C and D is in a random, alternating, tapered (often referred to as gradient), or block sequence. In one embodiment, the graft copolymer architecture is a random distribution of moieties A, A*, B, C and D.

In one embodiment of the invention, the graft copolymer is a (meth)acrylic graft copolymer.

In one embodiment, the invention provides a method of dispersing perylene-based pigments, anthraquinone-based pigments or quinacridone-based pigments comprising supplying to the pigments a composition of any of the embodiments above or below comprising a carrier liquid and a graft copolymer of Formula (1).

In one embodiment, the invention provides for the use of the graft copolymer of Formula (1) as a dispersant in the composition disclosed herein.

In one embodiment, the invention provides for the use of the graft copolymer of Formula (1) as disclosed herein as a dispersant for a particulate solid in a carrier liquid. In one embodiment the particulate solid is a pigment (such as, for instance, perylene-based pigments, anthraquinone-based pigments or quinacridone-based pigments). In the composition disclosed herein the graft copolymer of Formula (1) functions as a dispersant for the particulate solid.

DETAILED DESCRIPTION OF THE INVENTION

The present invention provides a composition as disclosed herein above.

As used herein, the term "graft copolymer" refers to a copolymer of graft macromolecules. A macromolecule with one or more species of block connected to a main chain as side-chains. The side-chains having constitutional or configurational features that differ from those in the main chain. Accordingly, the term graft copolymer may also encompass star (or radial) copolymers, or comb copolymers.

As used herein, any term with stem "(meth)acry" means a moiety or compound with a "methacryl" or "acryl" group.

The sum of J+K+L+M+N are such that the polymer typically has a number average molecular weight greater than 1000, or greater than 2000, or greater than 3000.

The sum of J+K+L+M+N are such that the polymer typically has a number average molecular weight of up to 100,000, or up to 60,000, or up to 40,000.

In different embodiment, the sum of J+K+L+M+N is such that the polymer has a number average molecular weight in the range of 1000 to 100,000, or 2000 to 60,000, or 3000 to 40,000.

Prior to quaternising, the amount of —$CH_2$—$C(R_1)(B)$— wherein B (i.e., a moiety that contains at least one polyester chain with a number average molecular weight of at least 200) in the graft copolymer of Formula (1) may be 50 to 90, or 60 to 80, or 65 to 75 weight percent of the graft copolymer.

Prior to quaternising, the other components (e.g., repeating units containing A* and optionally A, C, and D) defining the graft copolymer of Formula (1) may be 10 to 50, or 20 to 40, or 25 to 35 weight percent of the graft copolymer. In one embodiment the repeating units of A and A* comprise from 10 to 50, or 20 to 40, or 25 to 35 weight percent of the graft copolymer. In one embodiment of the above, M and N combined are less than 5 or 1, more desirably less than 0.5 or 0.1 and in still another embodiment approximately 0.0.

After quaternising, the amount of —$CH_2$—$C(R_1)(B)$— wherein B (i.e., a moiety that contains at least one polyester chain with a number average molecular weight of at least 200) in the graft copolymer of Formula (1) may be 35 to 80, or 45 to 70, or 50 to 60 weight percent of the graft copolymer.

After quaternising, the other components (e.g., repeating units containing A* and optionally A, C, and D) defining the graft copolymer of Formula (1) may be 20 to 65, or 30 to 55, or 40 to 50 weight percent of the graft copolymer. In one embodiment, the repeating units of A and A* comprise from 20 to 65, or 30 to 55, or 40 to 50 weight percent of the graft copolymer. In one embodiment of the above, M and N combined are less than 5 or 1, more desirably less than 0.5 or 0.1 and in still another embodiment approximately 0.0.

A is a moiety that contains at least one tertiary amine and/or basic nitrogen-containing, aromatic or heterocyclic ring group. Examples of moieties which comprise of component A are an imidazol group, a pyridine group, a carbazole group, or a quinoline group. In one embodiment, moiety A comprises of a tertiary amine group. Examples of the moiety A are represented by the Formulae (2) to (9):

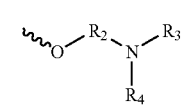

Formula (2)

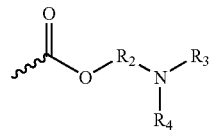

Formula (3)

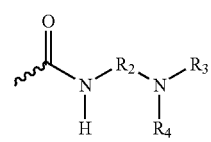

Formula (4)

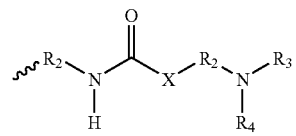

Formula (5)

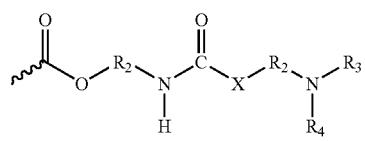

Formula (6)

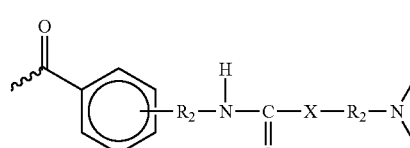

Formula (7)

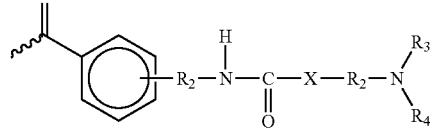

Formula (8)

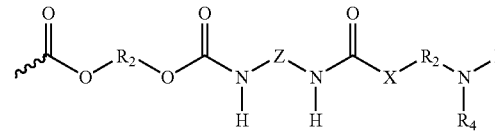

Formula (9)

wherein
$R_2$ is independently an alkylene group that may be linear or branched having a carbon number of 1-25;
$R_3$ and $R_4$ are independently linear or branched alkyl groups having carbon number of 1-4 (typically $R_3$ and $R_4$ are the same);
X represents an N—H group or oxygen atom; and
Z is a core residue of any diisocyanate compound i.e., Z can be considered to be the residue of the diisocyanate compound minus the two (NCO) isocyanate groups. Formula (8) illustrates this.

Moiety A of Formula (1) may be quaternised before or after polymerisation. Typically, moiety A is quaternised after the graft copolymer has been synthesised.

In one embodiment, the graft copolymer is a (meth)acrylic graft copolymer. Typically, the (meth)acrylic graft copolymer may be derived from a dialkylaminoalkyl(meth)acrylate, or mixtures thereof. Examples of a suitable dialkylaminoalkyl (meth)acrylate include dimethylaminoethyl methacrylate, dimethylaminoethyl acrylate, dimethylaminopropyl methacrylate, dimethylaminopropyl acrylate, or mixtures thereof.

A* of Formula (1) is any amount of A that has been quaternised by any known quaternising agent. Quaternising agents include alkyl halides, aralkyl halides, dialkyl carbonates, dialkyl sulphates or epoxides. Particularly useful quaternising agents for the graft copolymer of Formula (1) include benzyl chloride, dimethyl sulphate, propylene oxide, or styrene oxide. Often epoxides are used in the presence of equal molar quantity of acid (such as acetic acid).

The degree of quaternising may be from greater than 1%, or greater than 10%, or greater than 20% and or 40% or more of the amine moieties. The degree of quaternising may be as high as 100%, or 95% or 90% of the amine moieties. In different embodiments, the degree of quaternising ranges from greater than 1% to 100%, or greater than 10% to 95%, or greater than 20% to 95%, or 40% to 90%.

B is a moiety which contains at least one polymer chain comprising of a polyester $Y_1$ or $Y_2$ with a number average molecular weight of at least 200. The number average molecular weight may also be in the range of 300 to 5000, or 500 to 3000, or 1000 to 2500.

In one embodiment, Moiety B comprises of a polyester chain derived from a lactone or a hydroxycarboxylic acid, or mixtures thereof by at least one of the following Formulae (10)-(17):

Formula (10)

Formula (11)

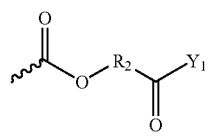
Formula (12)

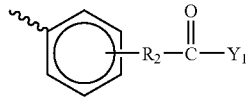
Formula (13)

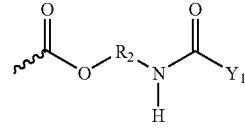
Formula (14)

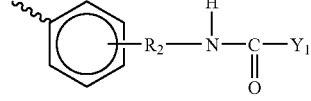
Formula (15)

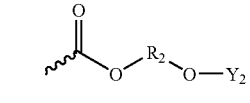
Formula (16)

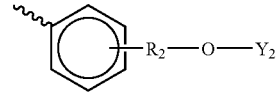
Formula (17)

In one embodiment, $Y_1$ is represented by at least one of the Formulae:

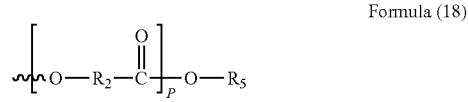
Formula (18)

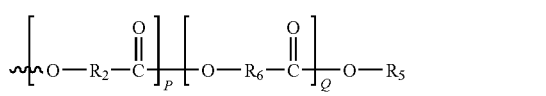
Formula (19)

In one embodiment, $Y_2$ is represented by at least one of the Formulae:

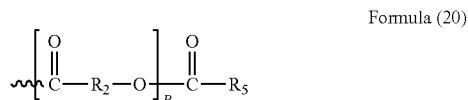
Formula (20)

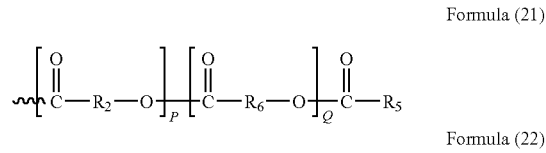
Formula (21)

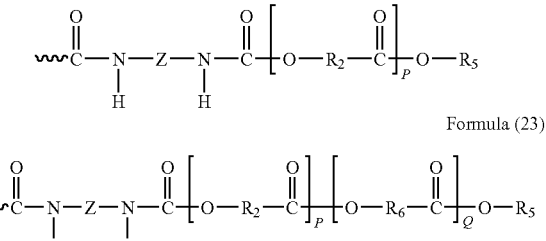
Formula (22)

Formula (23)

wherein for Formulae (10) to (23)
$R_2$, $R_3$, $R_4$, and Z are as previously defined;
$R_5$ represents H, —$CH_3$ or alkyl groups typically having 2 to 20 carbon atoms and the alkyl groups may be linear or branched (typically linear);
$R_6$ represents an alkylene group typically having 1 to 20 carbon atoms and the alkylene group may be linear or branched (typically linear);
P is an integer from 1 to 200;
Q is an integer from 1 to 200; and
$Y_1$ or $Y_2$ may be obtained/obtainable from a lactone or hydroxy carboxylic acid, typically containing 1 to 26 carbon atoms.

Examples of suitable lactones include β-propiolactone and optionally $C_{1-6}$-alkyl substituted δ-valerolactone and ε-caprolactone such as β-methyl-δ-valerolactone, δ-valerolactone, ε-caprolactone, 2-methyl-ε-caprolactone, 3-methyl-ε-caprolactone, 4-methyl-ε-caprolactone, 5-tert butyl-ε-caprolactone, 7-methyl-ε-caprolactone, 4,4,6-ε-caprolactone trimethyl-ε-caprolactone 4,6,6-trimethyl-ε-caprolactone, or mixtures thereof. In one embodiment, B is a moiety that contains at least one polyester chain derivable from δ-valerolactone and ε-caprolactone.

The hydroxy carboxylic acid may be saturated or unsaturated, linear or branched. Examples of suitable hydroxy carboxylic acids are glycolic acid, lactic acid, 5-hydroxy valeric acid, 6-hydroxy caproic acid, ricinoleic acid, 12-hydroxy stearic acid, 12-hydroxydodecanoic acid, 5-hydroxydodecanoic acid, 5-hydroxydecanoic acid 4-hydroxydecanoic acid, or mixtures thereof.

C is any non-functional moiety, or mixtures thereof. In one embodiment non-functional with respect to the C moiety means that the atoms of that moiety are generally carbon, hydrogen, and oxygen in structures unlikely to be involved in chemical condensation reactions involved in polymer chain extension of polymer functionalization. Examples of moieties that comprise of component C are aliphatic or aromatic esters (e.g. of carboxylic acids) and/or aliphatic or aromatic hydrocarbons. Examples of suitable non-functional moiety may be represented by Formulae (24)-(33).

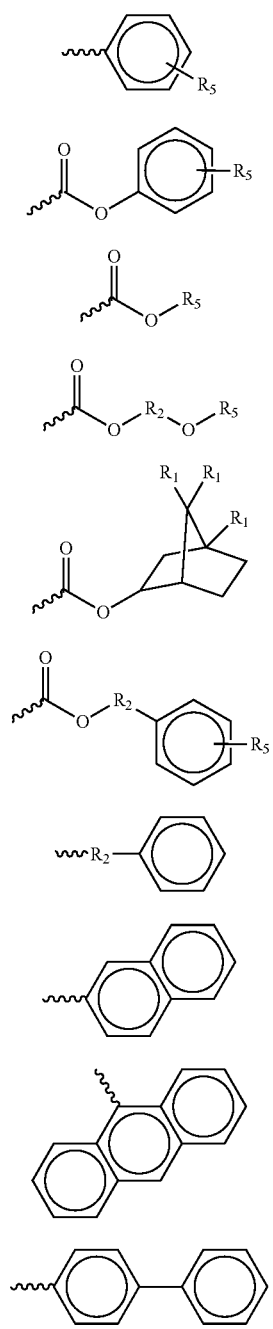

Formula (24)
Formula (25)
Formula (26)
Formula (27)
Formula (28)
Formula (29)
Formula (30)
Formula (31)
Formula (32)
Formula (33)

wherein
$R_2$, $R_3$, $R_4$ are as previously described; and $R_5$ represents H, —$CH_3$ or alkyl groups typically having 1 to 20 carbon atoms, and the alkyl groups may be linear or branched (typically linear).

In different embodiments, the non-functional moiety may be represented by phenyl moieties of Formula (24), phenyl esters Formula (27) and alkyl moieties Formula (28) (e.g., a butyl acrylate or 2-ethylhexyl acrylate). In one embodiment, the phenyl moieties of Formula (21) where $R_5$=H are useful.

In one embodiment, the moiety M (including the definitions of $R_1$ and C) may be styrene.

D is any functional or polar moiety or mixtures thereof. In one embodiment, the functional groups of the D moiety comprise groups that react in condensation type reactions common to polymerization reactions. Examples of moieties that comprise component D include any alcohol group, acid group, epoxide group, isocyanate group, ketone group, aldehyde group, β-diketoester group, acid chloride group, acetate group, nitrile group, ester group, vinyl group, acetyl group, or lactam group. Examples of suitable moieties for D may be represented by Formulae (34) to (51).

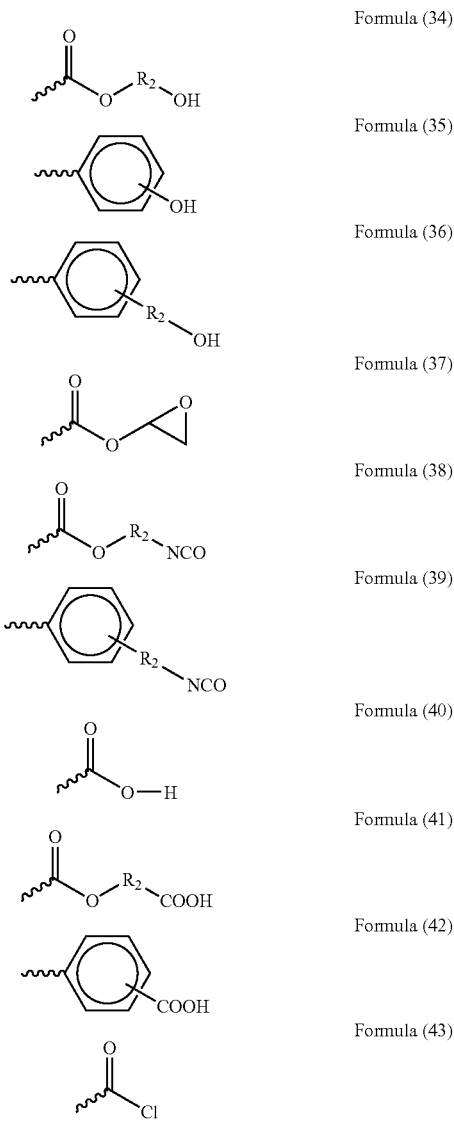

Formula (34)
Formula (35)
Formula (36)
Formula (37)
Formula (38)
Formula (39)
Formula (40)
Formula (41)
Formula (42)
Formula (43)

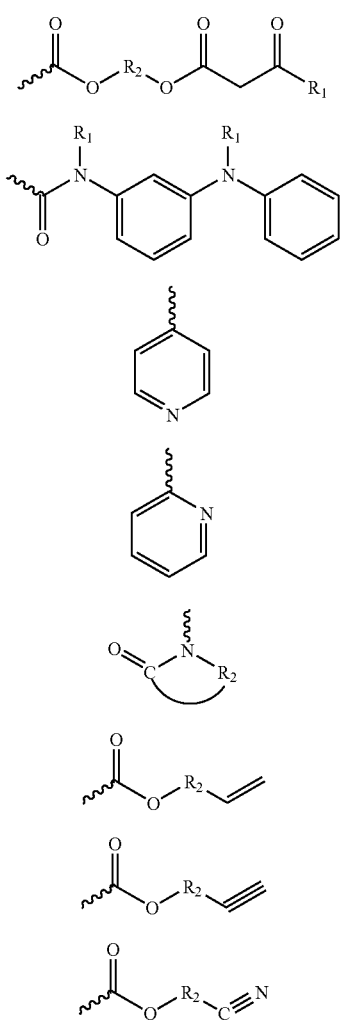

wherein R₁ and R₂ are as previously described.

In one embodiment, D includes an alcohol or acid functional moiety. Typically, D is a hydroxyl functional moiety.

Grafting

In one embodiment, the graft copolymer may be produced by polymerising together monomers (e.g., ethylenically unsaturated) represented by Formulae (a), (b), (c), and (d), wherein a portion of the tertiary amine moiety-containing monomer represented by Formula (a) is quaternised.

wherein $R_1$, A, B, C, and D are the same as defined above.

One method used for generating the graft copolymer is to polymerise monomer (a) and (b), optionally in the presence of (c) and/or (d). In one embodiment, the amount of (c) and (d) combined is less than 10 wt. %, more desirably less than 5 wt. % and preferably less than 1 wt. % of the resulting graft copolymer of Formula 1. In other embodiments, (c) and (d) are present in more significant amounts. The tertiary amine moiety of monomer (a) is then quaternised with a quaternising agent. Examples of suitable tertiary amine monomer (a) include dialkylaminoakyl(meth)acrylates. Particularly useful tertiary amine monomers include dimethylaminoethyl acrylate and dimethylaminoethyl methacrylate.

The macromonomer (b) may typically be prepared before copolymerisation with (a) and optionally (c) and/or (d). One example is the reaction of a hydroxyl functional polyester with a compound comprising of a vinyl group and an isocyanate group is shown in the following reaction scheme:

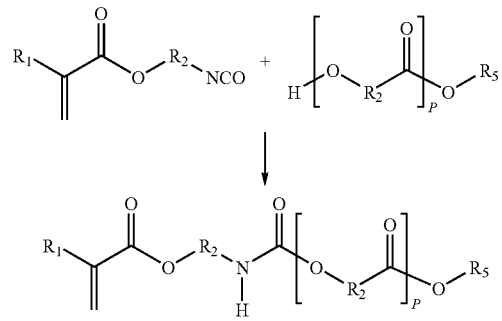

wherein $R_1$, $R_2$, $R_5$, and P are defined above.

Alternatively, a polyester based macromonomer may be synthesised by polymerising a lactone or a mixture of lactones using a hydroxyalkyl(meth)acrylate as shown in the following reaction scheme for a single lactone.

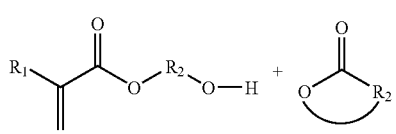

wherein $R_1$, $R_2$ and P are defined above.

The consequence of this reaction is that the polymer chain end typically contains a hydroxyl group. In such a reaction scheme, the ratio of hydroxyl functional moiety to lactone determines the molecular weight of the product.

In the reaction scheme shown in above, the number average molecular weight of the product may be typically less than 20,000, or less than 10,000, or less than 5000. In one embodiment, the reaction utilises a tin chloride catalyst.

Another method for generating the graft copolymer is to copolymerise (d) or mixtures of (d) with (a), and (b) and optionally (c). A polyester chain is then introduced that has one chain end reactive to (d). A proportion of (d) from 1-99% may remain unreacted, although 100% of (d) typically reacts. The resulting polymer is then quaternised. In one embodiment, an unsaturated isocyanate is polymerised with a tertiary amine functional monomer. The resulting isocyanate functional copolymer is then reacted with a hydroxyl functional polyester chain.

For example, isopropenyl-dimethylbenzyl isocyanate (commercially available from Cytec under the trademark TMI®) is copolymerised with dimethylaminoethyl(meth) acrylate (and optionally a monomer that meets the definition of (c) and/or (d), e.g., butyl(meth)acrylate) to form an isocyanate functional polymer. This polymer is then reacted with one or more hydroxyfunctional polyesters to form a graft copolymer. Up to 100% of the tertiary amine groups on the graft copolymer may then be quaternised with benzyl chloride or dimethyl sulphate.

In another example, isopropenyl-dimethylbenzyl isocyanate (commercially available from Cytec under the trademark TMI®) is copolymerised with dimethylaminoethyl(meth) acrylate to form an isocyanate functional polymer. This polymer is then reacted with one or more hydroxyfunctional polyesters to form a graft copolymer. Up to 100% of the tertiary amine groups on the graft copolymer may then be quaternised with benzyl chloride or dimethyl sulphate.

In another example, isopropenyl-dimethylbenzyl isocyanate is copolymerised with dimethylaminoethyl(meth)acrylate and styrene to form an isocyanate functional polymer. This polymer is then reacted with one or more hydroxyfunctional polyesters to form a graft copolymer. Up to 100% of the tertiary amine groups on the graft copolymer may then be quaternised with benzyl chloride or dimethyl sulphate.

The graft copolymer may be synthesised by any known polymerisation technique or a combination of polymerisation techniques using a bulk, solution, suspension or emulsion process. The polymerisation may comprise of a radical, anionic, cationic, atom transfer or group transfer polymerisation process or combinations thereof. In one embodiment, the graft copolymer is polymerised by a free radical polymerisation in the presence of a chain transfer agent. Examples of a free radical chain transfer agent include catalytic cobalt chain transfer agents or mercaptans. Mercaptans are particularly useful. In another embodiment, the graft copolymer is polymerised by a free radical polymerisation in the presence of a RAFT agent (a reversible addition, fragmentation chain transfer agent).

Examples of mercaptans include 2-mercaptoethanol, 3-mercaptopropanol, thiopropyleneglycol, thioglycerine, thioglycolic acid, thiohydracrylic acid, thiolactic acid and thiomalic acid, isooctyl thioglycolate, n-butyl 3-mercaptopropionate, n-butyl thioglycolate, glycol dimercaptoacetate, trimethylolpropane trithioglycolate, or mixtures thereof. If the polymerisation is performed in solvent preferred examples of mercaptans include isooctyl thioglycolate, n-butyl 3-mercaptopropionate, n-butyl thioglycolate, glycol dimercaptoacetate, trimethylolpropane trithioglycolate, or mixtures thereof. In one embodiment, the mercaptan is butyl 3-mercaptopropionate.

Examples of a RAFT chain transfer agent include benzyl 1-(2-pyrrolidinone)carbodithioate, benzyl (1,2-benzenedicarboximido) carbodithioate, 2-cyanoprop-2-yl 1-pyrrolecarbodithioate, 2-cyanobut-2-yl 1-pyrrolecarbodithioate, benzyl 1-imidazolecarbodithioate, N,N-dimethyl-S-(2-cyanoprop-2-yl)dithiocarbamate, N,N-diethyl-S-benzyl dithio carbamate, cyanomethyl 1-(2-pyrrolidone) carbodithoate, cumyl dithiobenzoate, 2-dodecylsulphanylthiocarbonyl-sulphanyl-2-methyl-propionic acid butyl ester, O-phenyl-S-benzyl xanthate, N,N-diethyl S-(2-ethoxy-carbonylprop-2-yl) dithiocarbamate, dithiobenzoic acid, 4-chlorodithiobenzoic acid, O-ethyl-S-(1-phenylethyl)xanthtate, O-ethyl-S-(2-(ethoxycarbonyl)prop-2-yl)xanthate, O-ethyl-S-(2-cyanoprop-2-yl)xanthate, O-ethyl-S-(2-cyanoprop-2-yl)xanthate, O-ethyl-S-cyanomethyl xanthate, O-pentafluorophenyl-S-benzyl xanthate, 3-benzylthio-5,5-dimethylcyclohex-2-ene-1-thione or benzyl 3,3-di(benzylthio)-prop-2-enedithioate, S,S'-bis-($\alpha,\alpha'$-disubstituted-$\alpha''$-acetic acid)-trithiocarbonate, S,S'-bis-($\alpha,\alpha'$-disubstituted-$\alpha''$-acetic acid)-trithiocarbonate or 5-alkyl-S'-($\alpha,\alpha'$-disubstituted-$\alpha''$-acetic acid)-trithio carbonates, benzyl dithiobenzoate, 1-phenylethyl dithiobenzoate, 2-phenylprop-2-yl dithiobenzoate, 1-acetoxyethyl dithiobenzoate, hexakis (thiobenzoylthiomethyl)benzene, 1,4-bis(thiobenzoylthiomethyl)benzene, 1,2,4,5-tetrakis(thiobenzoylthiomethyl) benzene, 1,4-bis-(2-(thiobenzoylthio)prop-2-yl)benzene, 1-(4-methoxyphenyl)ethyl dithiobenzoate, benzyl dithio acetate, ethoxycarbonylmethyl dithioacetate, 2-(ethoxycarbonyl)prop-2-yl dithiobenzoate, 2,4,4-trimethylpent-2-yl dithiobenzoate, 2-(4-chlorophenyl)prop-2-yl dithiobenzoate, 3-vinylbenzyl dithiobenzoate, 4-vinylbenzyl dithiobenzoate, S-benzyl diethoxyphosphinyldithio formate, tert-butyl trithioperbenzoate, 2-phenylprop-2-yl 4-chlorodithiobenzoate, 2-phenylprop-2-yl 1-dithionaphthalate, 4-cyanopentanoic acid dithiobenzoate, dibenzyl tetrathioterephthalate, dibenzyl trithiocarbonate, carboxymethyl dithiobenzoate or poly(ethylene oxide) with dithiobenzoate end group, or mixtures thereof.

Polymerisation in the presence of RAFT chain transfer agents is described in more detail in the Handbook of Radical Polymerization, edited by Krzysztof Matyjaszewski and Thomas P. Davis, 2002, Chapter 12, pages 629 to 690, published by John Wiley and Sons Inc. (hereinafter referred to as "Matyjaszewski et al."). A discussion of the polymer mechanism of RAFT polymerisation is shown on page 664 to 665 in Section 12.4.4 of Matyjaszewski et al.

If a solvent is used in the polymerisation process, suitable solvents include alcohols, such as methanol, ethanol, n-propanol, isopropanol, butanol, butoxyethanol; ketones, such as acetone, butanone, pentanone, hexanone and methyl ethyl ketone; alkyl esters of acetic, propionic and butyric acids, such as ethyl acetate, butyl acetate, amyl acetate, methoxy propyl acetate; ethers, such as tetrahydrofuran, diethyl ether, and ethylene glycol and polyethylene glycol monoalkyl and dialkyl ethers such as cellusolves and carbitols; and, glycols such as ethylene glycol and propylene glycol; and mixtures thereof. Esters and/or ketones and mixtures of esters and/or ketones with alcohols are particularly useful. In one embodiment, butyl acetate and methoxypropyl acetate and mixtures of butyl acetate or methoxypropyl acetate with alcohols are used as the solvent.

Polymerisation may be carried out at any suitable temperature for the solvent selected. Typically, polymerisation may be carried out in the presence of solvent at a temperature in the range of 50° C. to 150° C., or 60° C. to 120° C.

Any polymerisation initiator may be used. In one embodiment, the polymerisation initiator is any free radical polymerisation initiator; and the choice of initiator will be influenced by the polymerisation temperature and polymerisation process. The polymerisation initiators used in this process are known in the art and are selected from the conventional free radical initiators such as organic peroxides and azo compounds. The particular free radical initiator employed will depend upon the monomeric material(s) being polymerised and the process conditions. Typically, the amount of initiator may be in the range of 0.005 parts by weight to 5.00 parts by weight, based on 100 parts by weight of the monomer. However, 0.01 parts by weight to 2.00 parts by weight based on 100 parts by weight of monomer(s) is particularly useful.

Examples of suitable peroxide initiators include diacyl peroxides, dialkylperoxydicarbonates, t-alkyl peroxyesters, monoperoxycarbonates, diperoxyketals, diaklyperoxides, t-alkyl hydroperoxides, ketone peroxide. Examples of diacyl peroxides are dibenzoyl peroxide, di(2,4-dichlorobenzoyl) peroxide, diacetyl peroxide, dilauroyl peroxide, didecanoyl peroxide, diisononanoyl peroxide, succinic acid peroxide. Examples of suitable azo initiators include 2,2'-azobis(4-methoxy-2,4-dimethylvaleronitrile), 2,2'-azobis(2,4-dimethyl-valeronitrile, 2,2'-azobisisobutyronitrile, dimethyl 2,2'-azobisisobutyrate, 2,2'-azobis(2-methyl-butyronitrile), 1,1'-azobis(1-cyclohexanecarbonitrile), 2-(carbamoylazo)-isobutyronitrile, 2,2'-azobis(2,4,4-trimethyl-pentane.

The polymerisation temperature depends on the type of initiator used. In one embodiment, the initiator is selected so that polymerisation may be performed at a temperature of 50° C. and 100° C., or between 60° C. and 90° C. Typically, the initiators for use in the current invention include lauroyl peroxide, benzoyl peroxide, 1,1'-azobis(1-cyclohexanecarbonitrile), or 2,2'-azobisisobutyronitrile.

INDUSTRIAL APPLICATION

In one embodiment, the graft copolymer of Formula (1) is a dispersant.

The graft copolymer of Formula (1) in different embodiments is present in the composition of the invention in a range selected from 0.1 wt. % to 50 wt. %, or 0.25 wt. % to 35 wt. %, and 0.5 wt. % to 15 wt. % of the composition.

The particulate solid present in the composition may be any inorganic or organic solid material which is substantially insoluble in the carrier liquid e.g., an organic medium. In one embodiment, the particulate solid is a pigment.

In one embodiment, the composition of the invention provides a paint or ink including a particulate solid, a carrier liquid (may be an organic medium, or aqueous medium), a binder and a graft copolymer of Formula (1), or salts thereof.

In one embodiment, the solid is an organic pigment from any of the recognised classes of pigments described, for example, in the Third Edition of the Colour Index (1971) and subsequent revisions of, and supplements thereto, under the chapter headed "Pigments". Carbon black, although strictly inorganic, behaves more like an organic pigment in its dispersing properties.

Examples of suitable solids include inorganic solids, pigments for solvent inks; pigments, extenders and fillers for paints and plastics materials; dyes, especially disperse dyes; optical brightening agents and textile auxiliaries for solvent dyebaths, inks and other solvent application systems; solids for oil-based and invert-emulsion drilling muds; dirt and solid particles in dry cleaning fluids; particulate ceramic materials; magnetic materials and magnetic recording media, fire retardants such as those used in plastics materials and biocides, agrochemicals and pharmaceuticals which are applied as dispersions in organic media.

Inorganic solids include: extenders and fillers such as talc, kaolin, silica, barytes and chalk, flame-retardant fillers such as alumina trihydrate, or magnesium hydroxide; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g., gamma-$Fe_2O_3$, $Fe_3O_4$, and cobalt-doped iron oxides, calcium oxide, ferrites, especially barium ferrites; and metal particles, especially metallic iron, nickel, cobalt, copper and alloys thereof; and fire retardants such as aluminium trihydrate and magnesium hydroxide.

Some examples of suitable agrochemicals include fungicides flutriafen, carbendazim, chlorothalonil or mancozeb.

In one embodiment, the pigment includes perylene-based pigments, quinacridone-based pigments or anthraquinone-based pigments.

Perylene-based pigments include Pigment Black 32 (CAS No. 83524-75-8), Pigment Black 31 (CAS No. 67075-37-0), Pigment Red-Violet Perylene (CAS No. 51731-80-7), Pigment Red 123 (CAS No. 24108-89-2), Pigment Red 190 (CAS No. 6424-77-7), Pigment Red 179 (CAS No. 5521-31-3), Pigment Red 149 (CAS No. 4948-15-6), Pigment Red 178 (CAS No. 3049-71-6), Pigment Red 189 (CAS No. 2379-77-3), Pigment Red 224 (CAS No. 128-69-8), Pigment Green 47 (CAS No. 128-58-5), Pigment Blue 65 (CAS No. 116-71-2), and Pigment Violet 29 (CAS No. 81-33-4). Typically, perylene-based pigments include Pigment Red 149, Pigment Red 178 or Pigment Red 179.

Quinacridone-based pigments include Pigment Red 207 (CAS No. 71819-77-7), Pigment Red 209 (CAS No. 3573-01-1), Pigment Red 202 (CAS No. 3089-17-6), Pigment Violet 19 (CAS No. 1047-16-1), and Pigment Red 122 (CAS No. 980-26-7).

Anthraquinone pigments include Pigment Red Anthraquinone (CAS No. 111417-37-9), Anthraquinone Brilliant Blue (CAS No. 100359-31-7), Pigment Bordeaux Anthraquinone S (CAS No. 79585-80-1), Pigment Violet Anthraquinone (CAS No. 26687-58-1), Pigment Green 54 (CAS No. 25704-81-8), Pigment Violet 5 (CAS No. 22297-70-7), Pigment Violet 6 (CAS No. 6483-85-8), Pigment Red 89 (CAS No. 6409-74-1), Pigment Red 85 (CAS No. 6370-96-3), Pigment Yellow 23 (CAS No. 4981-43-5), Pigment Orange 43 (CAS No. 4424-06-0), Pigment Red 168 (CAS No. 4378-61-4), Pigment Red 194 (CAS No. 4216-02-8), Pigment Yellow 147 (CAS No. 4118-16-5), Pigment Red 177 (also known as Cromophtal Red A 3B, CAS No. 4051-63-2), Pigment Red 196 (CAS No. 2379-79-5), Pigment Green 47 (CAS No. 128-58-5) and Pigment Blue 60 (CAS No. 81-77-6).

The organic medium present in the composition of the invention in one embodiment is a plastics material and in another embodiment an organic medium. The organic medium may be a non-polar or a polar organic medium, although a polar organic medium is typically used. By the term "polar" in relation to the organic medium, it is meant that an organic medium is capable of forming moderate to strong bonds as described in the article entitled "A Three Dimensional Approach to Solubility" by Crowley et al. in Journal of Paint Technology, Vol. 38, 1966, at page 269. Such organic medium generally have a hydrogen bonding number of 5 or more as defined in the above mentioned article.

Examples of suitable polar organic medium are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic medium as used herein.

In one embodiment, polar organic medium include dialkyl ketones, alkyl esters of alkane carboxylic acids and alkanols, especially such liquids containing up to, and including, a total of 6 or 8 carbon atoms. As examples of the polar organic medium include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran. In one embodiment, solvents are alkanols, alkane carboxylic acids and esters of alkane carboxylic acids.

Examples of the organic medium, which may be used as polar organic medium are film-forming resins such as inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/melamine-formaldehyde, long oil alkyd, polyether polyols and multi-media resins such as acrylic and urea/aldehyde.

The organic medium may be a polyol, that is to say, an organic medium with two or more hydroxy groups. In one embodiment, polyols include alpha-omega diols or alpha-omega diol polyoxyethylenes (or polyethylene oxides).

In one embodiment, non-polar organic medium includes compounds containing aliphatic groups, aromatic groups or mixtures thereof. The non-polar organic medium include non-halogenated aromatic hydrocarbons (e.g., toluene and xylene), halogenated aromatic hydrocarbons (e.g., chlorobenzene, dichlorobenzene, chlorotoluene), non-halogenated aliphatic hydrocarbons (e.g., linear and branched aliphatic hydrocarbons containing six or more carbon atoms both fully and partially saturated), halogenated aliphatic hydrocarbons (e.g., dichloromethane, carbon tetrachloride, chloroform, trichloroethane) and natural non-polar organics (e.g., vegetable oil, sunflower oil, linseed oil, terpenes and glycerides).

In one embodiment, the organic medium includes at least 0.1% by weight, or 1% by weight or more of a polar organic medium based on the total organic medium.

The organic medium optionally further includes water. In one embodiment, the organic medium is free of water.

When the organic medium contains water the amount present in one embodiment is not greater than 70%, or not greater than 50%, or not greater than 40% by weight of the organic medium.

The resin may also be an unsaturated polyester resin including the so-called sheet moulding compounds and bulk moulding compounds which may be formulated with reinforcing fibres and fillers. Such moulding compounds are described in DE 3,643,007 and the monograph by P F Bruins entitled "Unsaturated Polyester Technology", Gordon and Breach Science publishers, 1976, pages 211 to 238.

If desired, the dispersions may contain other ingredients, for example, resins (where these do not already constitute the organic medium) binders, fluidising agents (such as those described in GB-A-1508576 and GB-A-2108143), anti-sedimentation agents, plasticisers, levelling agents and preservatives.

The composition typically contains 2.5 to 95% by weight of the particulate solid, the precise quantity depending on the nature of the solid and the relative densities of the solid and the organic medium. For example, a composition in which the solid is an organic material, such as an organic pigment, typically contains 5% to 40% by weight of the solid whereas a composition in which the solid is an inorganic material, such as an inorganic pigment, filler or extender, typically contains 40% to 90% by weight of the total of composition.

In one embodiment, the composition is prepared by milling the particulate solid in the organic medium at a temperature which is not greater than 40° C., or not greater than 30° C. However, when the solid is a crude phthalocyanine pigment such as copper phthalocyanine, it is sometimes useful to carry out the milling in an organic liquid at a temperature between 50 and 150° C. since greener and brighter shades may be obtained. This is particularly the case where the organic liquid is a high boiling aliphatic and/or aromatic distillate.

The composition may be obtained by any of the conventional methods known for preparing dispersions. Thus, the solid, the organic medium and the graft copolymer of Formula (1) may be mixed in any order, the mixture then being subjected to a mechanical treatment to reduce the particles of the solid to an appropriate size, for example by ball milling, bead milling, gravel milling or plastic milling until the dispersion is formed. Alternatively, the solid may be treated to reduce its particle size independently or in admixture with either, the organic medium or the graft copolymer of Formula (1), the other ingredient or ingredients then being added and the mixture being agitated to provide the dispersion.

If the composition is required in dry form, the liquid medium is typically volatile so that it may be readily removed from the particulate solid by a simple separation means such as evaporation. In one particularly useful composition, the composition comprises the liquid medium.

If the dry composition contains the graft copolymer of Formula (1) and the particulate solid, it may contain at least 0.2%, or at least 0.5%, or at least 1.0% of the graft copolymer of Formula (1) based on weight of the dry composition. In different embodiment, the dry composition contains not greater than 100%, or not greater than 50%, or not greater than 20%, or not greater than 10% by weight based on the weight of the particulate solid.

As described hereinbefore, the compositions are particularly suitable for preparing mill-bases where the particulate solid is milled in a liquid carrier in the presence of both a particulate solid and a film-forming resin binder.

Thus, according to a still further aspect of the invention there is provided a mill-base comprising a particulate solid, the graft copolymer of Formula (1) and a film-forming resin.

Typically, the mill-base contains from 5% to 70% or 10% to 50% by weight particulate solid based on the total weight of the mill-base.

The amount of resin in the mill-base can vary over wide limits but is typically not less than 10%, or not less than 15% by weight of the continuous/liquid phase of the mill-base. In different embodiments, the amount of resin is not greater than 50% or not greater than 40% by weight of the continuous/liquid phase of the mill-base.

The amount of the graft copolymer of Formula (1) in the mill-base is dependent on the amount of particulate solid but is may be a range of 0.1% to 10%, or 0.5% to 7.5% by weight of the mill-base.

Binders are polymeric materials including natural and synthetic materials. In one embodiment, binders include poly (meth)acrylates, polystyrenics, polyesters, polyurethanes, alkyds, polysaccharides such as cellulose, or natural proteins (such as casein). In different embodiments, the binder may be present in the composition at more than 50%, at more than 100%, or more than 200%, or more than 300%, or more than 400% based on the amount of particulate solid.

The amount of optional binder in the mill-base can vary over wide limits but is typically not less than 10%, and often not less than 20% by weight of the continuous/liquid phase of the mill-base. In one embodiment, the amount of binder is not greater than 50% or not greater than 40% by weight of the continuous/liquid phase of the mill-base.

In one embodiment, the composition of the invention further includes one or more additional known dispersants.

The following examples provide illustrations of the invention. These examples are non exhaustive and are not intended to limit the scope of the invention.

EXAMPLES

Intermediate A: Epsilon-caprolactone (275 parts) and 1-dodecanol (32.07 parts) are stirred together under nitrogen at 150° C. Zirconium butoxide catalyst (1.535 parts) is then added and the reactants stirred under nitrogen for approximately 20 hours at 180° C. The reactants are then cooled to 70° C. and 2-isocyanatoethyl methacrylate (26.7 parts) is added. The reactants are stirred under nitrogen for approximately 1 hour. After 1 hour, little or no isocyanate remains. After cooling to 20° C., a polyester waxy solid is obtained. The product is characterised by size exclusion chromatography relative to polystyrene standards and has Mn=2300 and Mw=5300. This is Intermediate A.

Intermediate B: Epsilon-caprolactone (350 parts) and 2-hydroxylethyl methacrylate (28.5 parts) are stirred together under nitrogen at 150° C. 4-Methoxy-phenol (0.38 g) and stannous chloride catalyst (0.02 parts) is then added and the reactants stirred under nitrogen for approximately 17 hours at 120° C. After cooling to 20° C., the polyester obtained is a waxy solid. The product is characterised by size exclusion chromatography relative to polystyrene standards and has Mn=2400 and Mw=3400. This is Intermediate B.

Intermediate C: Epsilon-caprolactone (200 parts) and 1-dodecanol (23.32 parts) are stirred together under nitrogen at 120° C. Stannous chloride catalyst (0.002 parts) is then added and the reactants stirred under nitrogen for approximately 20 hours at 120° C. The reactants are then cooled to 70° C. Then 3-isopropenyl-α,α-dimethylbenzyl isocyanate (26.5 parts) and dibutyltin dilaurate (0.25 parts) are added. The reactants are stirred under nitrogen for approximately 2 hours. After 2 hours, little or no isocyanate remains. After cooling to 20° C., a polyester waxy solid is obtained. The product is characterised by size exclusion chromatography relative to polystyrene standards and has Mn=2200 and Mw=2600. This is Intermediate C.

Intermediate D: Epsilon-caprolactone (800 parts) and 1-dodecanol (105.3 parts) are stirred together under nitrogen at 160° C. Zirconium butoxide catalyst (0.5 parts) is then added and the reactants stirred under nitrogen for approximately 20 hours at 180° C. The reactants are then cooled to 70° C. Then 3-isopropenyl-α,α-dimethylbenzyl isocyanate (120 parts) and dibutyltin dilaurate (4.5 parts) are added. The reactants are stirred under nitrogen for approximately 2 hours until little or no isocyanate remains. After cooling to 20° C., a polyester waxy solid is obtained. The product is characterised by size exclusion chromatography relative to polystyrene standards and has Mn=1600 and Mw=4300. This is Intermediate D.

Intermediate E: Epsilon-caprolactone (300 parts), delta-valerolactone (108.1 parts) and 1-dodecanol (57.6 parts) are stirred together under nitrogen at 160° C. Zirconium butoxide catalyst (2.33 parts) is then added and the reactants stirred under nitrogen for approximately 20 hours at 180° C. The reactants are then cooled to 70° C. Then 3-isopropenyl-α,α-dimethylbenzyl isocyanate (57.5 parts) and dibutyltin dilaurate (0.1 parts) are added. The reactants are stirred under nitrogen for approximately 2 hours until little or no isocyanate remains. After cooling to 20° C., a polyester is obtained. The product is characterised by size exclusion chromatography relative to polystyrene standards and has Mn=1900 and Mw=4500. This is Intermediate E.

Intermediate F: Epsilon-caprolactone (500 parts), poly (ethylene glycol)methyl ether (128 parts, Mn~350) and are stirred together under nitrogen at 150° C. Zirconium butoxide catalyst (2.5 parts) is then added and the reactants stirred under nitrogen for approximately 24 hours at 180° C. The reactants are then cooled to 20° C. The product is characterised by size exclusion chromatography relative to polystyrene standards and has Mn=2600 and Mw=5400. This is Intermediate F.

Dispersant Example 1

Intermediate A (30 parts) is dissolved in toluene (200 parts) and stirred under nitrogen at 50° C. Dimethylaminoethyl methacrylate (20 parts), 2,2'-azobisbutyronitrile (0.5 parts) and butyl 3-mercaptopropionate (0.62 parts in 10 parts toluene) are then added and the reactants stirred under nitrogen for approximately 20 hours at 70° C. The product is characterised by size exclusion chromatography relative to polystyrene standards and has Mn=11,400 and Mw=25,400. Benzyl chloride (14.5 parts) and butoxyethanol (80 parts) are then added. The reaction mixture is then stirred for approximately 20 hours at 70° C. The resulting product is then concentrated to 37 wt. % solids on a rotary evaporator. This is Dispersant 1.

Dispersant Example 2

Intermediate B (28 parts) is dissolved in methyl propyl acetate (30 parts) and butoxyethanol (30 parts) and stirred under nitrogen at 70° C. Dimethylaminoethyl methacrylate (12 parts), 2,2'-azobisbutyronitrile (0.4 parts) and butyl 3-mercaptopropionate (0.37 parts) are then added and the reactants stirred under nitrogen for approximately 20 hours at 70° C. The product is characterised by size exclusion chromatography relative to polystyrene standards and has Mn=14,400 and Mw=38,200. Benzyl chloride (8.7 parts) is then added. The reaction mixture is then stirred for approximately 20 hours at 70° C. The resulting product had a solids content of 45 wt. %. This is Dispersant 2.

Dispersant Example 3

Intermediate C (28 parts) is dissolved in methoxy propyl acetate (20 parts) and butoxyethanol (20 parts) and stirred under nitrogen at 90° C. Dimethylaminoethyl acrylate (12 parts), 1,1'-azobis(cyclohexanecarbonitrile) (0.4 parts) and butyl 3-mercaptopropionate (0.37 parts) are then added and the reactants stirred under nitrogen for approximately 22 hours at 90° C. The product is characterised by size exclusion chromatography relative to polystyrene standards and has Mn=7200 and Mw=31,700. The reactants are then cooled to 70° C. and benzyl chloride (9.5 parts) is added. The reaction mixture is then stirred for approximately 6 hours at 70° C. The resulting product has a solids content of 52 wt. %. This is Dispersant 3.

Dispersant Example 4

Intermediate D (68 parts) is dissolved in methoxy propyl acetate (50 parts) and butoxyethanol (50 parts) and stirred under nitrogen at 90° C. Dimethylamino ethyl acrylate (30 parts), 1,1'-azobis(cyclohexanecarbonitrile) (1.0 parts) and butyl 3-mercaptopropionate (1.0 parts) is then added and the reactants stirred under nitrogen for approximately 24 hours at 90° C. The product is characterised by size exclusion chromatography relative to polystyrene standards and has Mn=6800 and Mw=29,500. The reactants are then cooled to 70° C. and benzyl chloride (23.9 parts) is added. The reaction mixture is then stirred for approximately 6 hours at 70° C. The resulting product is diluted with methoxy propyl acetate to 35% solids. This is Dispersant 4.

Dispersant Example 5

Intermediate D (68 parts) is dissolved in butyl acetate (100 parts) and stirred under nitrogen at 90° C. Dimethylaminoethyl acrylate (15 parts), styrene (15 parts), 1,1'-azobis(cyclohexanecarbonitrile) (1.0 parts) and butyl 3-mercaptopropionate (1.0 parts) is then added and the reactants stirred under nitrogen for approximately 24 hours at 90° C. The product is characterised by size exclusion chromatography relative to polystyrene standards and has Mn=5900 and Mw=30,400. The reactants are cooled to 70° C. and benzyl chloride (11.9 parts) is added. The reaction mixture is then stirred for approximately 6 hours at 70° C. The resulting product has a solids content of 50 wt. %. This is Dispersant 5.

Dispersant Example 6

Intermediate E (140 parts), dimethylaminoethyl acrylate (60 parts) and butyl 3-mercaptopropionate (1.8 parts), methoxy propyl acetate (100 parts) and butoxy ethanol (100 parts) are and stirred together under nitrogen at 90° C. 1,1'-azobis (cyclohexanecarbonitrile) (2.0 parts) and butyl 3-mercaptopropionate (1.8 parts) is then added and the reactants stirred under nitrogen for approximately 24 hours at 90° C. The product (210.71 parts) is removed from the reaction vessel and characterized by size exclusion chromatography relative to polystyrene standards and has Mn=4500 and Mw=21000. The remaining product (193.05 parts) is cooled to 70° C. and benzyl chloride (22.9 parts) and methoxy propyl acetate (22.9 parts) are added. The reaction mixture is then stirred for approximately 6 hours at 70° C. The resulting product has a solids content of 46 wt. %. This is Dispersant 6.

Dispersant Example 7

Intermediate E (60 parts), dimethylaminoethyl acrylate (25 parts), hydroxyethyl acrylate (5.0 parts) and butyl 3-mercaptopropionate (1.0 parts), methoxy propyl acetate (60 parts) and butoxy ethanol (30 parts) are and stirred together under nitrogen at 90° C. 1,1'-azobis(cyclohexanecarbonitrile) (1.0 parts) and butyl 3-mercaptopropionate (1.0 parts) is then added and the reactants stirred under nitrogen for approximately 24 hours at 90° C. The product (80 parts) is removed from the reaction vessel and characterised by size exclusion chromatography relative to polystyrene standards and has Mn=4200 and Mw=24000. The remaining product (100 parts) is cooled to 70° C. and benzyl chloride (5.4 parts) and methoxy propyl acetate (5.4 parts) are added. The reaction mixture is then stirred for approximately 6 hours at 70° C. The resulting product has a solids content of 49 wt. %. This is Dispersant 7.

Dispersant Example 8

Intermediate F (69.34 parts), 3-isopropenyl-α,α-dimethylbenzyl isocyanate (8.7 parts) methoxy propyl acetate (70 parts) and dibutyltin dilaurate (0.1 parts) are stirred under nitrogen for approximately 2 hours at 90° C. until little or no isocyanate remains. Dimethylaminoethyl acrylate (30 parts), methoxy propyl acetate (30 parts) butyl 3-mercaptopropionate (1.5 parts) and 1,1'-azobis(cyclohexanecarbonitrile) (1.0 parts) are added and the reactants stirred under nitrogen for approximately 20 hrs at 90° C. The product is characterised by size exclusion chromatography relative to polystyrene standards and has Mn=5500 and Mw=28400.

The reactants are cooled to 70° C. and benzyl chloride (8 parts) and methoxy propyl acetate (8 parts) are added. The reactants are then stirred under nitrogen for 20 hrs at 70° C. The resulting product has a solids content of 52%. This is Dispersant 8.

Pigment Dispersion Performance: Dispersions were prepared by dissolving Dispersants 6 to 8 (1.0 parts) in butyl acetate (7.0 parts). 3 mm glass beads (20 parts) and red pigment (2.0 parts, Cromophtal Red A3B, ex Ciba) were added and the contents were milled on a horizontal shaker for 16 hours. The resultant mill bases were fluid.

Comparative Dispersant 1 (CED1) is the similar to Dispersant Example 4, except the dispersant is prepared without the addition of benzyl chloride.

Comparative Dispersant 2 (CED2) is the similar to Dispersant Example 5, except the dispersant is prepared without the addition of benzyl chloride.

Dispersion Evaluation 1: Dispersions are prepared by dissolving dispersants 1 to 3 in a 1:1:1 mixture of xylene:butyl acetate:methoxypropyl acetate (based on dissolving 1.3 parts dispersant (50% active) in 18.6 parts solvent) then adding Desmophen A 760 (8.75 parts, ex Bayer, a hydroxyl-bearing polyacrylate). Red pigment (6.3 parts, Cromophtal Red A3B, ex Ciba) then 3 mm glass beads (125 parts) are added and the contents are milled on a Skandex shaker for 1 hour. This is the mill base.

The viscosity (Pa s) of each mill base is measured on a Bohlin V88 rheometer, using a 2.5°/15 mm cone at a shear rate of 37.6 $S^{-1}$.

Desmophen A760 (10.94 parts ex Bayer) and 1:1:1 mixture of xylene:butyl acetate:methoxypropyl acetate (2.22 parts) is then added to the mill base. The resulting mill base (4.82 parts) is then mixed with Desmodure N-3390 (0.44 parts, ex Bayer, an isocyanate functional material) and drawn down onto black and white card using a number 3 K-bar. After the coating is dried in air, the gloss is measured using a Byk Gardner gloss meter. The viscosity of each millbase and gloss values obtained for the coatings formulated using Dispersants 1 to 3 are:

TABLE 1

| Dispersant | Parts of Dispersant solution | Parts of Xylene/butyl acetate/methoxy propyl acetate | Mill base viscosity at 37.6 S$^{-1}$ | Gloss Value of coating 20° | Gloss Value of coating 60° |
|---|---|---|---|---|---|
| 1 | 3.6 | 16.35 | <0.1 | 106 | 108 |
| 2 | 2.8 | 17.15 | <0.6 | 96 | 105 |
| 3 | 2.5 | 17.43 | <0.1 | 109 | 107 |

Dispersion Evaluation 2: Compatibility with CAB resin: Dispersions are prepared by dissolving Dispersant 4 (3.18 parts) in butyl acetate (9.7 parts). Red pigment (11.00 parts, Paliogen Maroon L3920, ex BASF) and 3 mm glass beads (125 parts) are added. Macrynal SMC565 (7.44 parts ex UCB Chemicals) and a 15% CAB resin solution in butyl acetate (8.68 parts, ex Eastman Chemicals) is then added to the mill base. The contents are milled on a skandex shaker for 1 hour. This is the mill base.

The resulting mill base (1.28 parts) is then mixed with a 15% solution of CAB resin in butyl acetate (1.00 parts, ex Eastman Chemicals), Macrynal SMC565 (1.21 parts, ex UCB Chemicals), Desmodur N3390 (0.23 parts, ex Bayer) and butyl acetate (1.06 parts). The mixture is drawn down onto black and white card using a number 3 K-bar. The resulting coating employing Dispersant 4 has excellent colour strength and exhibited high transparency and gloss.

Dispersion Evaluation 3: Comparison of Dispersant Examples 4 and 5, with CED1 and CED2

Dispersions are prepared by dissolving the dispersants in butyl acetate. (based on dissolving 2.89 parts dispersant (50% active) in 11.95 parts solvent) Macrynal SMC565 (10.5 parts ex UCB Chemicals) and 3 mm glass beads (125 parts) and red pigment (7.23 parts, Cromophtal Red A 3B, ex Ciba) are added. The contents are milled on a skandex shaker for 1 hour. The viscosity of the mill base is measured as described above. The mill bases (1.93 parts) are let down into a solution of Macrynal SMC565 (2.94 parts ex UCB Chemicals) and Desmodur N3390 (0.33 parts, ex Bayer) in butyl acetate (0.85 parts) then drawn down onto black and white card using a number 3 K-bar. After the coating is dried in air, the gloss is measured using a Byk Gardner gloss meter. The viscosity and gloss values obtained for Dispersants 4, 5, CED1 and CED2 are.

TABLE 2

| Dispersant | Parts of Dispersant solution | Parts of Solvent | Mill base Viscosity at 37.6 S$^{-1}$ | Gloss Value of coating 20° | Gloss Value of coating 60° |
|---|---|---|---|---|---|
| 4 | 4.00 | 10.84 | <0.1 | 93.3 | 97.3 |
| 5 | 3.36 | 11.48 | <0.1 | 93.0 | 97.8 |
| CED1 | 2.89 | 11.95 | 16.1 | Too thick for draw down | |
| CED2 | 2.89 | 11.95 | 14.3 | Too thick for draw down | |

Dispersion Evaluation 4: Dispersions are prepared by dissolving dispersants 4 and 5, CED1 and CED2 in butyl acetate (based on dissolving 2.57 parts dispersant (50% active) in 4.53 parts solvent). Macrynal SMC565 (8.54 parts ex UCB Chemicals) and a 15% CAB resin solution in butyl acetate (10.05 parts, ex Eastman Chemicals) is then added. 3 mm glass beads (125 parts) and red pigment (6.43 parts, Cromophtal Red A3B, ex Ciba) are added and the contents are milled on a skandex shaker for 2 hours. Butyl acetate (10 parts) is then added to the millbase and the contents milled for a further 2 hours.

The resulting mill bases (2.17 parts) are then mixed with Macrynal SMC565 (2.94 parts, ex UCB Chemicals), Desmodur N3390 (0.33 parts, ex Bayer) and butyl acetate (0.85 parts). The mixture is drawn down onto black and white card using a number 3 K-bar. After the coating is dried in air the gloss is measured using a Byk Gardner Gloss Meter and colour strength is visually assessed. The results obtained are:

TABLE 3

| Dispersant | Parts of Dispersant solution | Parts of butyl acetate (total in millbase) | Mill base Viscosity at 37.6 S$^{-1}$ | Gloss Value of coating 20° | Gloss Value of coating 60° | Colour Strength of coating |
|---|---|---|---|---|---|---|
| 4 | 3.56 | 13.54 | 0.35 | 82.8 | 95.5 | Strong |
| 5 | 2.99 | 14.11 | <0.1 | 87.4 | 96.3 | Strong |
| CED1 | 2.57 | 14.53 | 5.0 | 68.7 | 89.3 | Weak |
| CED2 | 2.57 | 14.53 | 4.4 | 63.8 | 87.7 | Weak |

Dispersion Evaluation 5: the mill base of dispersions from Evaluation 4 (0.84 parts) are let down into Acrythane White (7.4 parts, ex HMG Paints Limited) and Acrythane Hardner (1.8 parts ex HMG Paints Limited). After the coating is dried in air the gloss is measured using a Byk Gardner gloss meter and the colour strength and shock seeding are measured visually. The results obtained are:

TABLE 4

| Dispersant | Gloss Value of coating 20° | Gloss Value of coating 60° | Colour Strength of coating | Shock seeding |
|---|---|---|---|---|
| 4 | 85.4 | 94.5 | Strong | No |
| 5 | 81.8 | 94.1 | Strong | No |

TABLE 4-continued

| Dispersant | Gloss Value of coating 20° | Gloss Value of coating 60° | Colour Strength of coating | Shock seeding |
|---|---|---|---|---|
| CED1 | 74.0 | 88.2 | Weak | Yes |
| CED2 | 75.1 | 89.0 | Weak | Yes |

The results indicate that the dispersant disclosed herein is capable of providing a pigment in solvent based systems with at least one of acceptable dispersancy, acceptable transparency, acceptable viscosity, and acceptable shock seeding, and also is capable of providing acceptable properties to a coating, especially for perylene pigments, anthraquinone pigments or quinacridone-based pigments.

Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. It is to be understood that the upper and lower amount, range, and ratio limits set forth herein may be independently combined. Similarly, the ranges and amounts for each element of the invention may be used together with ranges or amounts for any of the other elements.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition comprising a particulate solid, a carrier liquid and a graft copolymer of Formula (1):

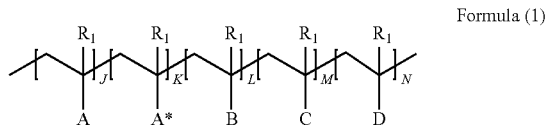

Formula (1)

wherein
 $R_1$ is a $CH_3$ or H group;
 A is a moiety which contains at least one tertiary amine group;
 A* is a quaternised amine-containing moiety;
 B is a moiety that contains at least one polyester chain with a number average molecular weight of at least 200;
 C is a moiety that does not contain a reactive functional group;
 D is a moiety which contains at least one reactive functional group or polar group;
 J, K, L, M and N are the average (non-negative) number of repeating units containing the moieties A, A*, B, C, and D respectively within the graft copolymer;
 J is optionally equal to 0;
 K is not equal to 0;
 L is not equal to 0;
 M is optionally equal to 0;
 N is optionally equal to 0; and
 wherein the graft copolymer of Formula 1 is characterized as a (meth)acrylic graft copolymer derived from a dialkylaminoalkyl (meth) acrylate, or mixtures thereof.

2. The composition of claim 1, wherein the graft copolymer of Formula 1 comprises repeating units including —$CH_2$—$C(R_1)(A^*)$- and wherein the first three atoms of the A* moiety pendant on the repeating unit —$CH_2$—$C(R_1)$— backbone are $C(=O)$—O— or $C(=O)$—N—.

3. The composition of claim 1, wherein A* is a quaternised with benzyl chloride, dimethyl sulphate, propylene oxide, or styrene oxide.

4. The composition of claim 1, wherein B comprises a polyester chain derived from polymerizing a lactone or hydroxycarboxylic acid, or mixtures thereof.

5. The composition of claim 4, wherein B comprises a polyester chain with a number average molecular weight in the range of 300 to 5000 Dalton.

6. The composition of claim 1, wherein N is equal to 0.

7. The composition of claim 1, wherein the sum of J+K+L+M+N is such that the graft copolymer has a number average molecular weight in the range of 1000 to 100,000 Dalton.

8. The composition of claim 1, wherein the amount of —$CH_2$—$C(R_1)$B— in the graft copolymer of formula (1) prior to quaternising is 50 to weight percent, based on the weight of the graft copolymer.

9. The composition of claim 1, wherein the amount of —$CH_2$—$C(R_1)$B— in the graft copolymer of formula (1) after quaternising is 35 to 80 weight percent, based on the weight of the graft copolymer.

10. The composition of claim 1, wherein the graft copolymer of Formula (1) is present at 0.1 wt % to 50 wt % based on the weight of the composition.

11. The composition of claim 1, wherein the graft copolymer of Formula (1) is present at 0.5 wt % to 30 wt % based on the weight of the composition.

12. The composition of claim 1, wherein the particulate solid comprises a pigment.

13. The composition of claim 12, wherein the pigment is selected from the group consisting of perylene-based pigments, anthraquinone-based pigments and quinacridone-based pigments.

14. The composition of claim 1, wherein the sum of J+K+L+M+N is such that the graft copolymer has a number average molecular weight in the range of 2000 to 60,000 Dalton.

15. The composition of claim 1, wherein the sum of J+K+L+M+N is such that the graft copolymer has a number average molecular weight in the range of 3000 to 40,000 Dalton.

16. The composition of claim 1, wherein B is a polylactone chain with a number average molecular weight in the range of 1000 to 2500 Dalton.

* * * * *